United States Patent [19]
Grelier et al.

[11] Patent Number: 6,160,229
[45] Date of Patent: Dec. 12, 2000

[54] ELECTRICAL SWITCHGEAR APPARATUS COMPRISING A PLUG-IN CIRCUIT BREAKER AND POSITION INDICATORS OF THE CIRCUIT BREAKER IN ITS FRAME

[75] Inventors: Claude Grelier, Crolles; Jacques Joubert, Montbonnot, both of France

[73] Assignee: Schneider Electric Industries SA, France

[21] Appl. No.: 09/392,775

[22] Filed: Sep. 9, 1999

[30] Foreign Application Priority Data

Sep. 11, 1998 [FR] France .................................. 98 11515

[51] Int. Cl.[7] ...................................................... H01H 9/20
[52] U.S. Cl. ....................................................... 200/50.26
[58] Field of Search ............................... 200/17 R, 50.01, 200/50.02, 50.21, 50.23, 50.24, 50.26, 400, 401, 500, 501, 308; 361/605–609, 615

[56] References Cited

U.S. PATENT DOCUMENTS

| | | | |
|---|---|---|---|
| 3,991,291 | 11/1976 | McGuffie et al. ..................... | 200/50 A |
| 4,236,189 | 11/1980 | Yosida ..................................... | 361/337 |
| 5,043,541 | 8/1991 | Krafft et al. ......................... | 200/50 AA |
| 5,097,382 | 3/1992 | Leach et al. ............................. | 361/345 |
| 5,434,369 | 7/1995 | Tempcoe t al. ..................... | 200/50 AA |
| 5,684,282 | 11/1997 | Castonguay et al. ................ | 200/50.21 |
| 6,005,208 | 12/1999 | Castonguay ............................. | 200/308 |

*Primary Examiner*—Michael Friedhofer
*Attorney, Agent, or Firm*—Parkhurst & Wendel, L.L.P.

[57] ABSTRACT

An electrical switchgear apparatus comprises a plug-in circuit breaker movable in a fixed frame by means of a drive mechanism. A movable element, secured to the circuit breaker or to the drive mechanism, takes indexed positions characteristic of the plugged-out, test or plugged-in state of the apparatus. The apparatus is provided with at least two indicating switches. Indexing means enable each of the switches to be connected to the movable element in such a way that the first switch switches when the movable element reaches a first indexing position and that the second switch switches when the movable element reaches a second indexing position. The same indexing means, placed in a second state, also enable each of the switches to be connected to the movable element in such a way that the first switch switches when the movable element reaches the second indexing position and that the second switch switches when the movable element reaches the first indexing position.

10 Claims, 12 Drawing Sheets

ELECTRICAL SWITCHGEAR APPARATUS COMPRISING A PLUG-IN CIRCUIT BREAKER AND POSITION INDICATORS OF THE CIRCUIT BREAKER IN ITS FRAME

BACKGROUND OF THE INVENTION

The invention relates to an electrical switchgear apparatus comprising a fixed frame and a circuit breaker movable in the fixed frame between a plugged-out position and a plugged-in position.

The document EP-A-0,677,904 describes a device for indicating the position of a slide rack comprising a switchgear apparatus with three indicating switches and a control means for controlling these indicating switches according to the position of the slide rack in the frame of the apparatus. The control means is a pull-rod whose position reflects that of the slide rack, and comprising spigots designed to each operate in conjunction with one of the indicating switches in such a way that one of the switches is activated when the slide rack reaches a position called the plugged-out position, that a second indicating switch is activated when a position called the test position is reached, and that the third indicating switch is activated when a position called the plugged-in position is reached. For the sake of economy, the control means is formed in such a way that it can be used with indicating switches situated either on the right or the left of the slide rack. With such a device, it is however not possible to modulate on site the number of switches assigned to a given indication or to choose on site which switch will be assigned to a given indication.

SUMMARY OF THE INVENTION

One object of the present invention is therefore to overcome the drawbacks of the state of the technique and in particular to achieve a plug-in switchgear apparatus comprising a plurality of electrical indicating switches, each assigned to indication of an indexed position of the circuit breaker in its frame, enabling the assignment of certain switches to be modified on site.

A second object is to enable the choice of the location of the switches assigned to a given indexed position of the circuit breaker to be put off to a later stage in the manufacturing line.

These objects are achieved by means of an electrical switchgear apparatus comprising:
  a fixed frame,
  a circuit breaker movable in the fixed frame between a plugged-in position and a plugged-out position,
  a reversible mechanism for driving the circuit breaker between its plugged-in position and its plugged-out position,
  a movable element, secured to the drive mechanism or to the circuit breaker, able to take a plurality of positions with respect to the frame, between a first extreme position and a second extreme position, and defining a first indexed positions interval, which may be reduced to a first indexed position, and a second indexed positions interval, which may be reduced to a second indexed position,
  a first electrical indicating switch comprising at least two terminals and a primary actuating means designed to close an electrical circuit connecting the two terminals by switching from a first position to a second position,
  a second electrical indicating switch comprising at least two terminals and a primary actuating means designed to close an electrical circuit connecting the two terminals by switching from a first position to a second position,
  indexing means designed to be fitted on the switchgear apparatus in a first state in which they are designed to operate in conjunction with the first switch so as to make the primary actuating means of the first switch move from one of its positions to the other when the movable element reaches its first indexed positions interval, and to operate in conjunction with the second switch so as to make the primary actuating means of the second switch move from one of its positions to the other when the movable element reaches its second indexed positions interval, wherein
  the indexing means are designed to be fitted on the switchgear apparatus in a second state in which they are able to operate in conjunction with the first switch so as to make the primary actuating means of the first switch move from one of its positions to the other when the movable element reaches its second indexed positions interval, and to operate in conjunction with the second switch so as to make the primary actuating means of the second switch move from one of its positions to the other when the movable element reaches its first indexed positions interval.

Preferably, the indexing means comprise:
  a first support device,
  a second support device,
  a first indexing means which, in the first state of the indexing means, operates in conjunction with the first support device and with the first switch and which, in the second state of the indexing means, operates in conjunction with the second support device and with the second switch,
  a second indexing means which, in the first state of the indexing means, operates in conjunction with the second support device and with the second switch and which, in the second state of the indexing means, operates in conjunction with the first support device and with the first switch.

To permute the functions of the two switches, the two indexing means then simply have to be switched, whereby achieving a great simplicity of use.

According to a preferred embodiment, in each of the states of the indexing means, the first and second support devices are fixed with respect to the terminals of the switches and, in each of the states of the indexing means, each indexing means is movable with respect to the support device with which it operates in conjunction and is able to perform kinematic transmission between the movable driving means and the primary actuating means. In this case, each indexing means is specific of an indexing position. With this device, it also becomes possible to modify the number of switches assigned to a given position of the circuit breaker in its frame, provided that additional indexing means of both types are available in sufficient number. For example, if it is desired that all the switches be assigned to the first indexing position of the apparatus, all the indexing means similar to the means of the second type simply have to be replaced by means similar to the means of the first type.

More specifically, each of the indexing means is a lever which, in each of the states of the indexing means, is linked by a pivot to the support device with which it operates in conjunction. Alternately, the different indexing means can be cams of specific shapes.

According to another embodiment, in each of the states of the indexing means, the first and second support devices are movable with respect to the terminals of the switches and are driven by the movable element. Moreover, in each of the states of the indexing means, each indexing means is fixed with respect to the support device with which it operates in conjunction and is able to perform kinematic transmission between the support device with which it operates in conjunction and the primary actuating means.

According to another embodiment, the switchgear apparatus is such that in another state of the indexing means, the first indexing means is designed to operate in conjunction with the first support device and the first switch so as to make the primary actuating means of the first switch move from one of its positions to the other when the movable element reaches its second indexed positions interval, the second indexing means is designed to operate in conjunction with the second support device and the second switch so as to make the primary actuating means of the second switch move from one of its positions to the other when the movable element reaches its first indexed positions interval.

With the latter two types of structures, indexing means of identical form can be used. In this case, it is not the type of indexing means which is determinant but only its fitting mode on the support device. The number of switches assigned to an indexed position of the circuit breaker can then be modified without even having recourse to additional sets of indexing means.

The number of indexed positions and that of the switches are not restrictive: in practice, it is common to use three indexed positions called plugged-out, test and plugged-in, and at least three indicating switches. This is why, in preferred manner:

the movable element defines with respect to the frame a third indexed positions interval which may be reduced to a third indexed position, the switchgear apparatus comprises a third electrical indicating switch comprising at least two terminals and a primary actuating means designed to close an electrical circuit connecting the two terminals by switching from a first to a second position, the indexing means are designed, in their first state, to operate in conjunction with the third switch so as to make the primary actuating means of the third switch move from one of its positions to the other when the movable element reaches its third indexed positions interval, and the indexing means are designed to be fitted onto the switchgear apparatus in a third state in which they are able to operate in conjunction with the first switch so as to make the primary actuating means of the first switch move from one of its positions to the other when the movable element reaches its third indexed positions interval, and to operate in conjunction with the third switch so as to make the primary actuating means of the third switch move from one of its positions to the other when the movable element reaches its first indexed positions interval.

It is also common practice to assign more than one indicating switch per indexing position so as to provide the device with a sufficient redundancy or to supply information to different control or protection devices.

Preferably, the terminals of the switches are fixed with respect to the frame. More specifically, each switch comprises a case, the cases of the switches being fixed to a common support base securely united to the frame and also acting as support for the connectors of an electrical connection terminal between the control circuits of the switchgear apparatus and the outside. The connectors have the same form as the cases of the switches, which enables the locations reserved for the latter to be inverted to a certain extent.

According to one embodiment, the first indexing switch has a different form from that of the second indexing means. This arrangement has the advantage of enabling precise visualization of the function assigned to each switch.

BRIEF DESCRIPTION OF THE DRAWINGS

Other advantages and features of the invention will become more clearly apparent from the following description of different embodiments of the invention, given as non-restrictive examples only and represented in the accompanying drawings in which.

DETAILED DESCRIPTION OF THE PREFERRED EMBODIMENT

Figure 1:
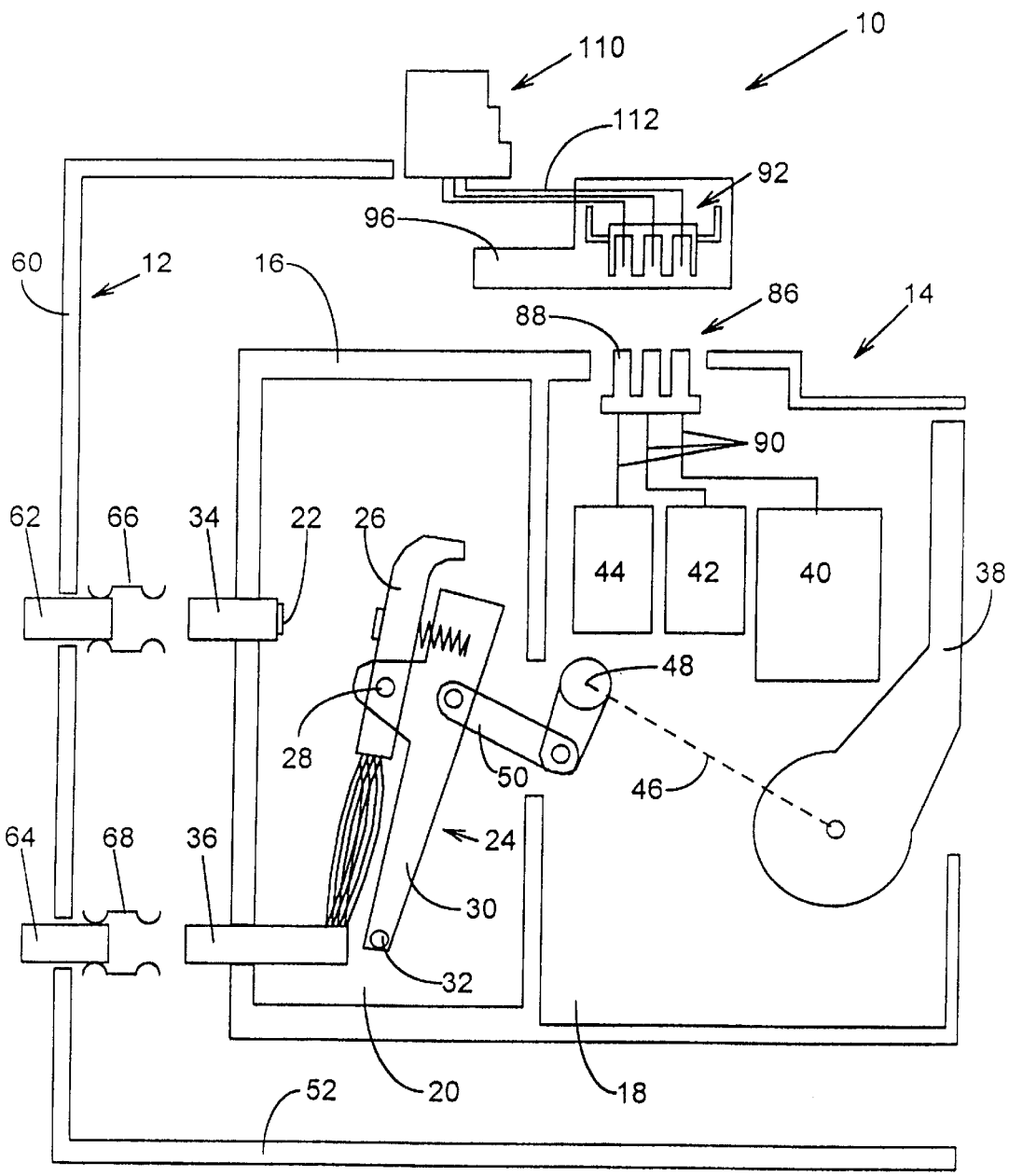
FIG. 1 schematically represents a cross sectional view of a switchgear apparatus according to a first embodiment of the invention, comprising a plug-in circuit breaker and its frame.

With reference to FIG. 1, a low-voltage electrical switchgear apparatus 10 comprises a fixed frame 12 designed to be placed for example in an electrical cabinet and a plug-in circuit breaker 14 movable in translation inside the frame 12. The circuit breaker 14, of high rating, notably up to 6000 Amps, is housed in a case 16 made of insulating material subdivided into a front compartment 18 and a rear compartment 20. The rear compartment 20 houses one or more poles each comprising a pair of main contact means with a stationary contact means 22 and a movable contact means 24. The movable contact means 24 comprises a plurality of contact fingers 26 pivotally mounted around a spindle 28 securely united to a contact tunnel 30 itself mounted pivoting around a fixed spindle 32. Each contact means 22, 24 is electrically connected to a corresponding electrical terminal 34, 36 of the circuit breaker. A more detailed description of the structure of the poles can be found in the document FR-A-2,650,434, the description of which is incorporated here on this point by reference. The front compartment 18 contains an operating device with a setting lever 38 of an energy storage system (not represented), an electronic trip device 40 causing automatic tripping when a fault current, in particular an overload, short-circuit or earth fault occurs, and electrical measuring, indicating and monitoring auxiliaries 42, 44, in particular auxiliaries indicating tripping or the state of the circuit breaker. The operating device, represented in broken lines in 46, acts on a pole shaft 48, which in turn acts on each of the movable contact means 24 by means of a rod 50. An open position of each of the movable contact means 24 corresponds to a first angular position of the pole shaft 48. A closed position of all the movable contact means 24 corresponds to a second angular position of the pole shaft 48. For a more precise description of the operating device 46, reference should be made to the document EP-A-0,222,645 the description of which is incorporated here on this point by reference.

Figure 2:
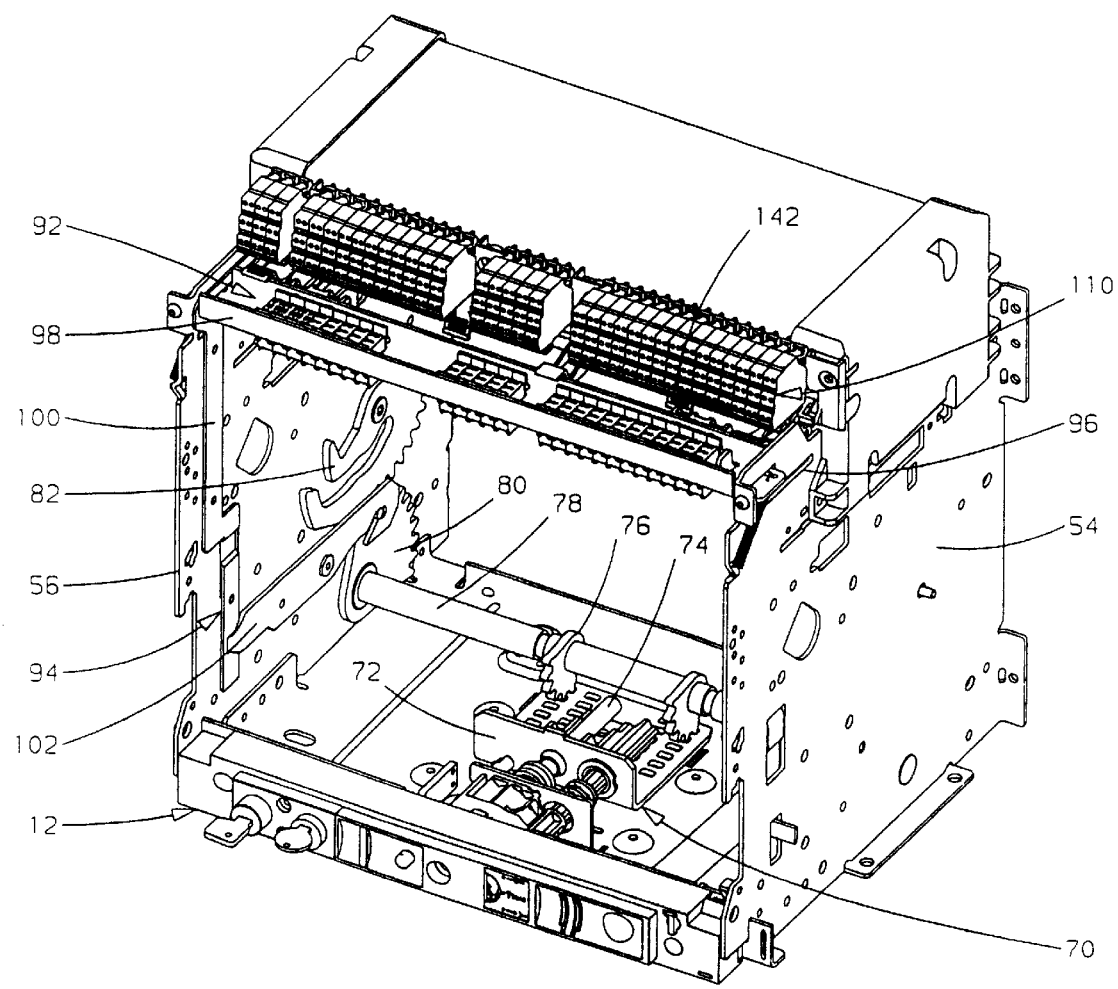
FIG. 2 represents in perspective the frame of the apparatus of FIG. 1.

The frame 12 in the form of an open housing represented in greater detail in FIG. 2 comprises a base plate 52 and two opposite side walls 54, 56 confining a front opening for insertion or removal of the plug-in circuit breaker. The side walls 54, 56 are provided with draw-in slides designed to support and guide the circuit breaker in its movement. These slides 58 can be seen in FIG. 3 but have been removed in FIG. 2, so as to reveal other elements of the switchgear apparatus. Opposite the front opening there is located an insulating connecting base 60 forming the bottom of the frame, through which fixed connection strips 62, 64 pass equipped with draw-in finger contacts 66, 68. The fixed strips 62, 64 are designed to be connected to a busbar of the electrical cabinet. In the plugged-in position of the circuit breaker 14, the terminals 34, 36 of the circuit breaker are engaged in the draw-in finger contacts 66, 68 which provide the electrical contact with the fixed strips 62, 64. The frame 12 supports a plug-in mechanism 70 comprising a crown-wheel device 72 operating in conjunction with a control screw 74 able to be actuated by a crank, not represented. The crown-wheel device 72 drives pinions 76 secured to a transverse draw-in shaft 78. The shaft also supports at each of its ends a counterpinion 80 engaging with a toothed sector of a draw-in cam 82. Each draw-in cam 82 is mounted pivoting around a spindle 84 securely affixed to the frame.

In addition to the main terminals 34, 36, the circuit breaker comprises an auxiliary connecting device 86, designed to establish or interrupt the electrical connection between the auxiliaries and the trip device on the one hand and external remote control and monitoring means on the other hand. The connection device is provided with a plurality of fixed auxiliary connectors 88 connected by wiring conductors 90 to the different auxiliaries 42, 44 and to the electronic trip device 40. The auxiliary connectors 88 are fixed at the level of the upper wall of the circuit breaker case 16.

Figure 4:
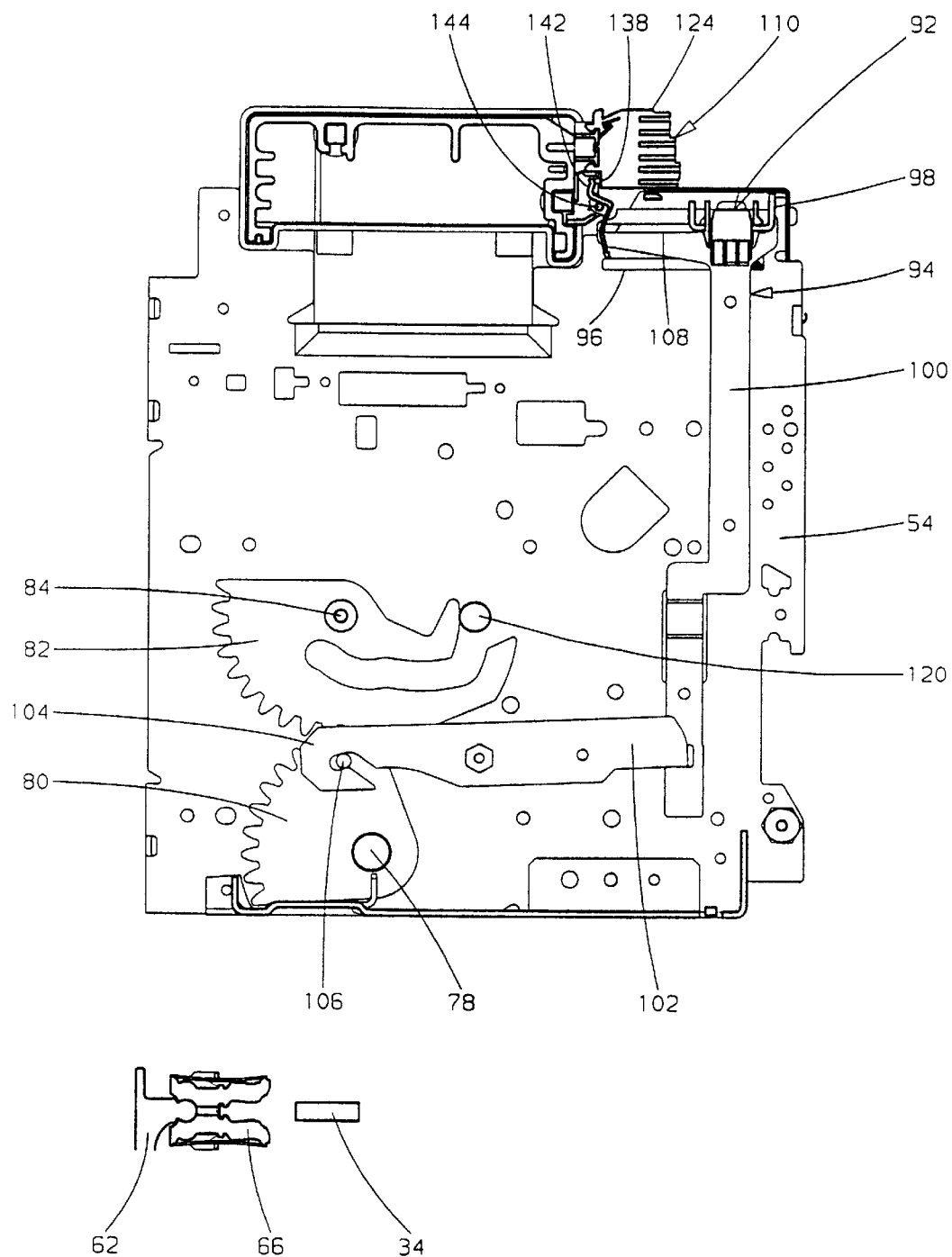
FIG. 4 represents certain elements of the frame in a "plugged-out" state of the apparatus of FIG. 1.
Figure 5:
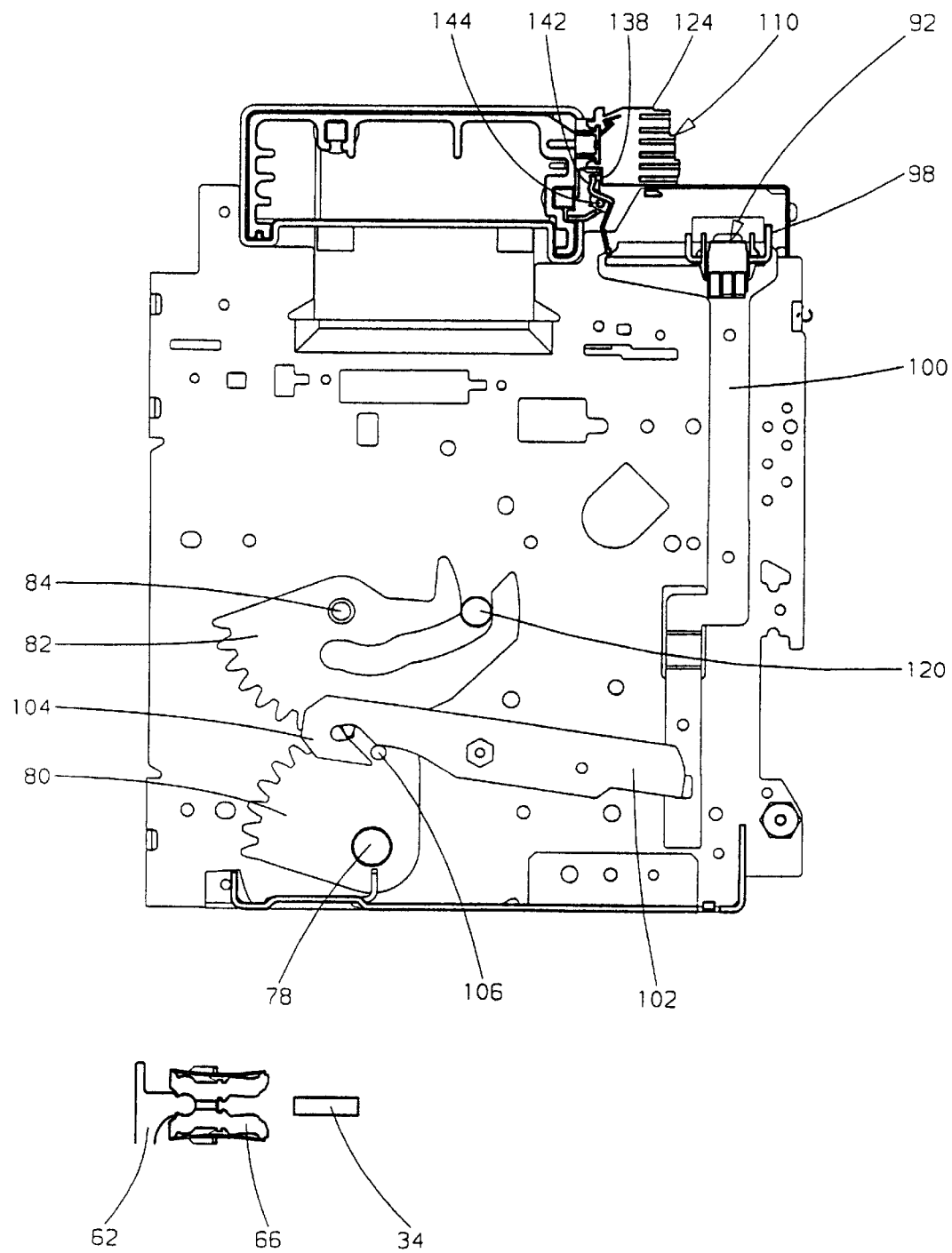
FIG. 5 represents certain elements of the frame in a "test" state of the apparatus of FIG. 1.

The fixed auxiliary connectors 88 of the circuit breaker operate in conjunction by plugging-in with a movable terminal block 92 associated to a guide device 94 forming part of the plug-in mechanism 70. This guide device 94, which can be seen in FIGS. 3 to 5, comprises an L-shaped guide slide 96 made in each of the side walls 54, 56 of the frame, and a cross-member 98 supporting the movable terminal block 92. The cross-member 98 operates in conjunction with two vertical transmission rods 100 each guided in translation along a side wall of the frame. The end of a lever 102 is articulated at the bottom end of each rod 100, the other end of said lever comprising a hook 104 operating in conjunction with a spigot 106 fixed onto the corresponding counterpinion 80. The upper end of each rod 100 comprises a horizontal slide rack 108 operating in conjunction with one end of the cross-member 98, which also operates in conjunction with the L-shaped slide 96. In the upper part of the frame there is disposed a fixed connection terminal block 110 designed for electrical connection with the remote control and monitoring means. A bundle of flexible conductors 112 electrically connects the movable terminal block 92 with the connection terminal block 110.

Figure 3:
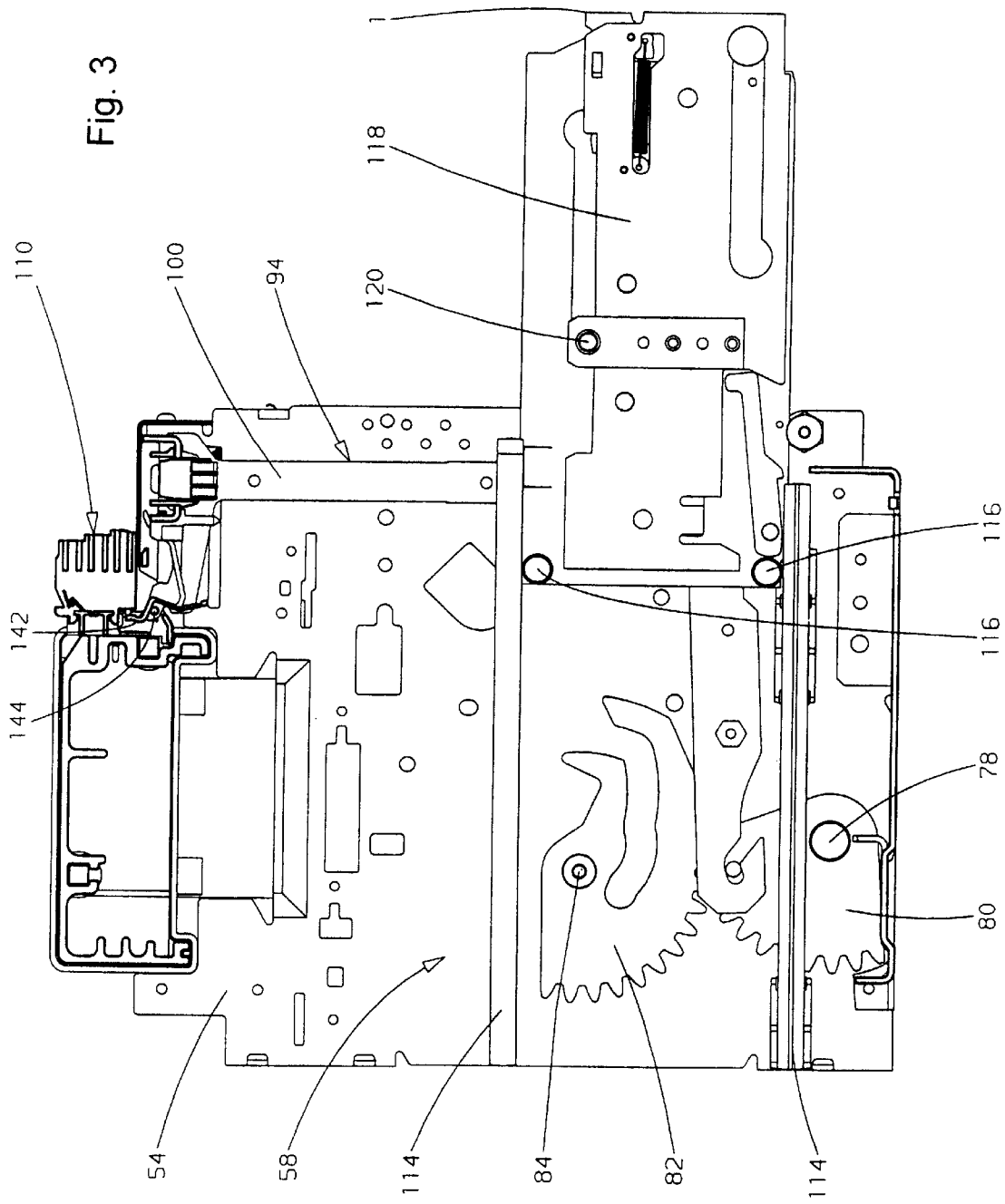
FIG. 3 represents certain elements of the frame in an "extracted" state of the apparatus of FIG. 1.

The circuit breaker 14 is guided in translation with respect to the frame by means of the draw-in slides 58. These slides, which can be seen in FIG. 3, are formed on each side by two parallel rails 114 which operate in conjunction with rollers 116 secured to a support arm 118 of the circuit breaker. The sliding arm 118 comprises notches designed to operate in conjunction with corresponding spigots of the circuit breaker to enable the latter to be held in position, and also a crankpin 120 designed to operate in conjunction with the draw-in cam 82.

Figure 6:
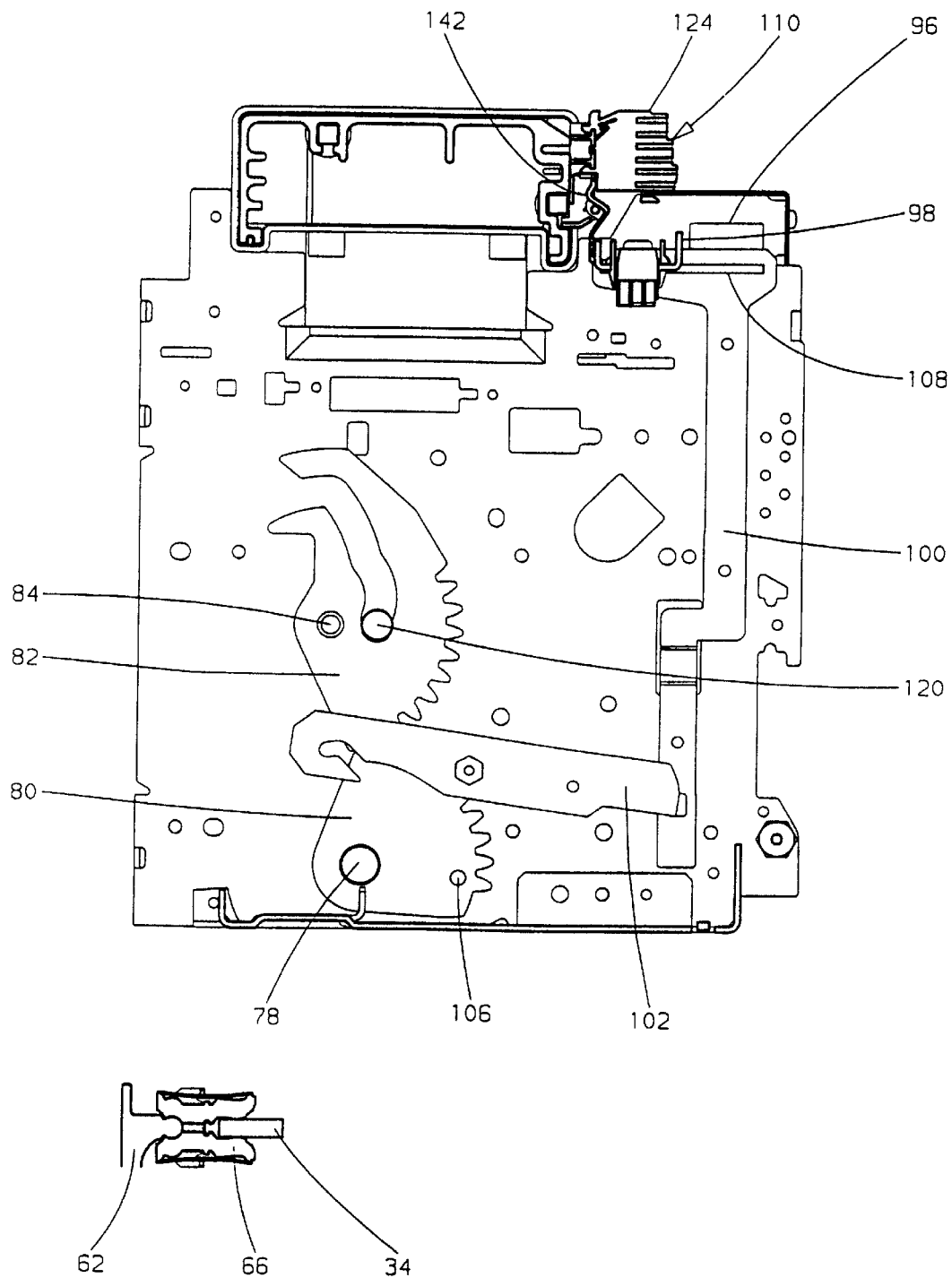
FIG. 6 represents certain elements of the frame in a "plugged-in" state of the apparatus of FIG. 1.

The circuit breaker 14 is able to occupy several positions with respect to the frame 12 staggered along the longitudinal draw-in direction, and in particular: an extracted position, corresponding to full extension of the support arms visible in FIG. 3, a plugged-out position with or without test, and a plugged-in position. In the extracted position, it is possible to proceed with extraction of the circuit breaker by removing the latter from the slides. From this position, the circuit breaker is pushed manually to the plugged-out position, in which the crankpins 120 press against the draw-in cams. The plugged-out position of the apparatus has been represented schematically in FIG. 4, by removing the sliding support arms and the circuit breaker, but leaving the crankpin 120. In this position, the terminals 34, 36 of the circuit breaker are at a sufficient disconnecting distance from the draw-in finger contacts 66, 68. When the plug-in mechanism is actuated, it generates rotation of the draw-in shaft 78 and cams 82, which in a first phase act only on the vertical rods 100. These rods lower the cross-member 98 to the position represented in FIG. 5 and perform engagement of the movable contact terminal 92 on the auxiliary connectors 86. During this phase, the circuit breaker remains immobile in its plugged-out position, the circuit breaker terminals 34, 36 consequently remaining at the same disconnection distance from the draw-in finger contacts 66, 68 as in the plugged-out state. In a second phase, actuation of the plug-in mechanism 70 performs translational movement of the support arms 118 and of the circuit breaker 14 to the plugged-in position represented in FIG. 6, thus performing connection between the circuit breaker terminals 34, 36 and the connection strips 62, 64 of the frame by means of the draw-in finger contacts 66, 68. During this phase, the movable terminal block 92 slides in the guide slides 96 and remains connected to the auxiliary connectors 86 of the circuit breaker. The movement of the plug-in mechanism 70 is reversible and withdrawal also comprises two phases, a first phase of movement of the circuit breaker to its plugged-out position achieving disconnection of the circuit, and a second phase of disconnection of the auxiliary circuits. With such a device, each state of the switchgear apparatus—i.e. the "plugged-out" state in which the main and auxiliary circuits of the circuit breaker are disconnected, the "test" state in which the auxiliary circuits are connected whereas the main circuits are still disconnected, and the "plugged-in" state in which the main and auxiliary circuits are connected—corresponds to a characteristic angular position of the draw-in shaft, and a characteristic position of the cross-member 98 of the terminal block 92, which moves while remaining parallel to itself on an L-shaped trajectory with respect to the frame.

Figure 7:
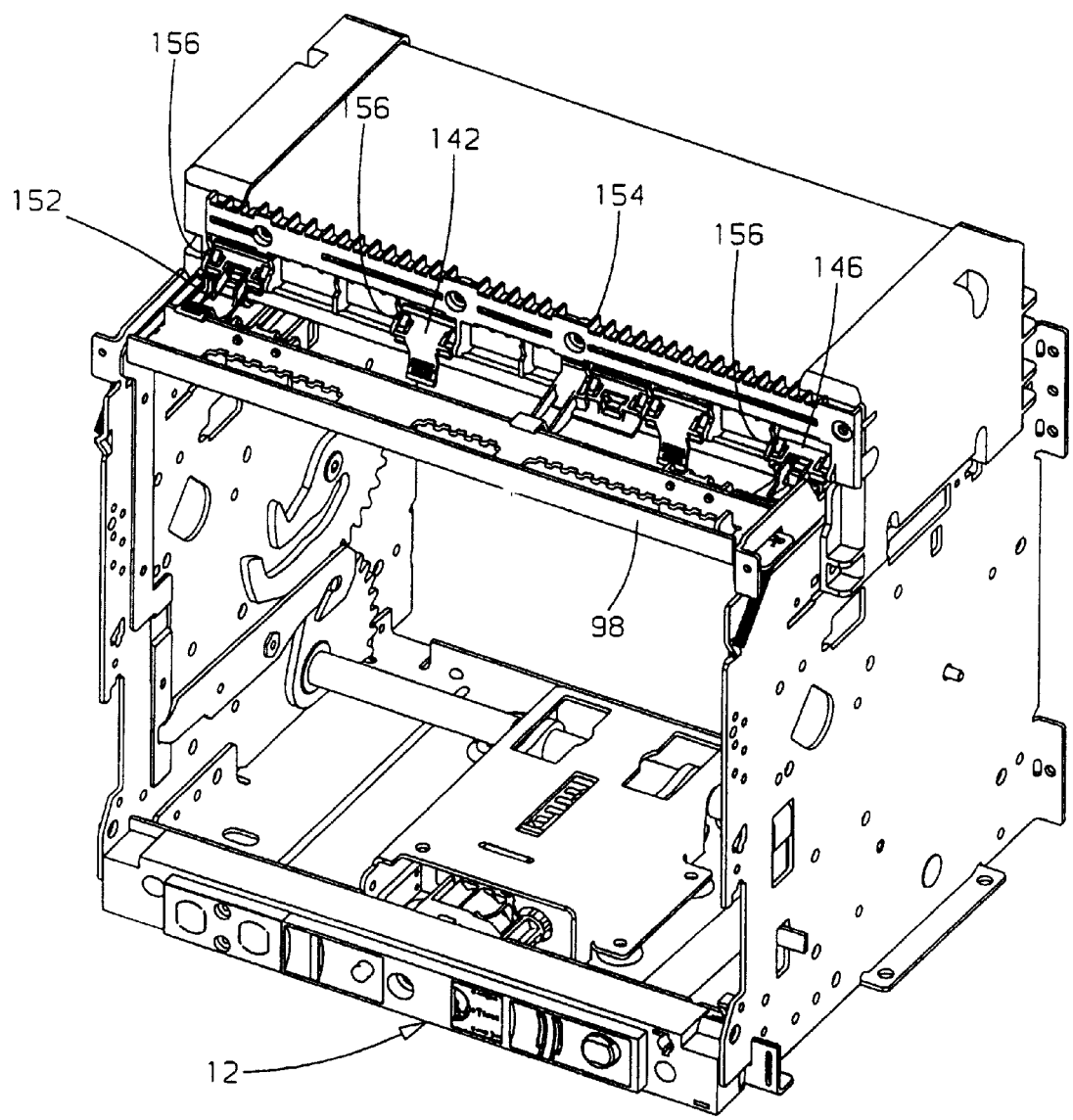
FIG. 7 represents in perspective the frame equipped with indexing means represented individually in FIGS. 8 to 10.

FIG. 7 represents the frame 12 of the apparatus without the connection terminal block 110, which enables a support base 154 of said terminal block to be revealed. The base 154 comprises recesses 156, three in this example. Each recess laterally comprises two supports for receipt of a pivoting spindle 144 (visible in FIGS. 8 to 10) of a lever 142, 146, 152 respectively. The recesses being of identical shapes, as are the spindles of the different levers 142, 146, 152, it is possible to permute the levers at will.

Figure 8:
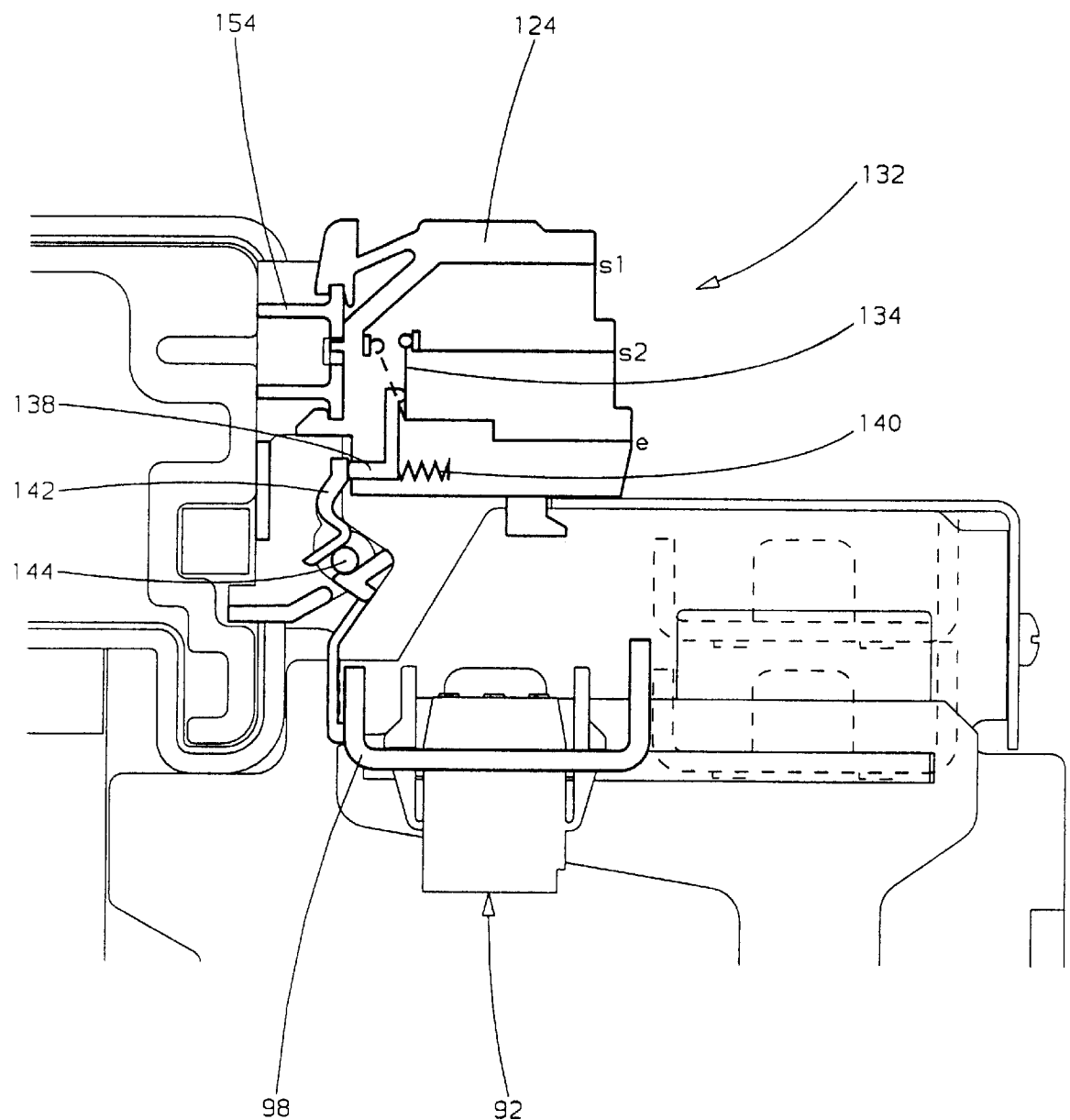
FIG. 8 represents indexing means enabling a switch of the apparatus to be activated when the apparatus is in its plugged-in state.

Each recess 156 enables three adjacent identical switches to be fixed. One of the switches 132 is schematically represented in FIG. 8. The switch comprises a case 124 designed to be integrated in the fixed connection terminal block 110 of the frame. This case 124 comprises three external connection terminals "e", "$s_1$", "$s_2$" and contains a movable switching means 134 secured to a pushbutton 138. The pushbutton 138 is guided in translation with respect to the case 124 and one of its ends emerges from the case 124. The switching means and pushbutton are flexibly biased to a rest position corresponding to a raised position of the pushbutton by a spring 140. At rest, the pushbutton is in the raised position and the circuit is closed between "e" and "$s_1$" and open between "e" and "$S_2$". When the pushbutton is actuated, the circuit opens between "e" and "$s_1$" and closes between "e" and "$s_2$".

A driven arm of the lever 142, pivoting around the spindle 144 supported by the base 154, actuates the three pushbuttons 138 of the three adjacent switches 132 fixed to the recess 156. The drive arm of the lever 142 is designed to operate in conjunction with the cross-member 98 supporting the movable terminal block 92, as can be seen in FIGS. 4 to 7. So long as the cross-member 98 does not press against the left part of the guide slide 96 and the slide rack 108 of the rod 100 (FIGS. 4 and 5), the lever does not actuate the pushbuttons, so that the switch 132 remains in its rest position. As soon as the cross-member 98 of the mechanism 70 reaches the extreme position of FIGS. 6 and 8, the lever is solicited and depresses the pushbuttons, which act on the movable switching means so as to close the contact between "e" and "$s_2$". The lever thus enables the three adjacent switches 132 situated in the recess in which it is fitted to be commanded simultaneously.

Other forms of levers enable switching of the switch to be achieved for other positions of the mechanism.

Figure 9:
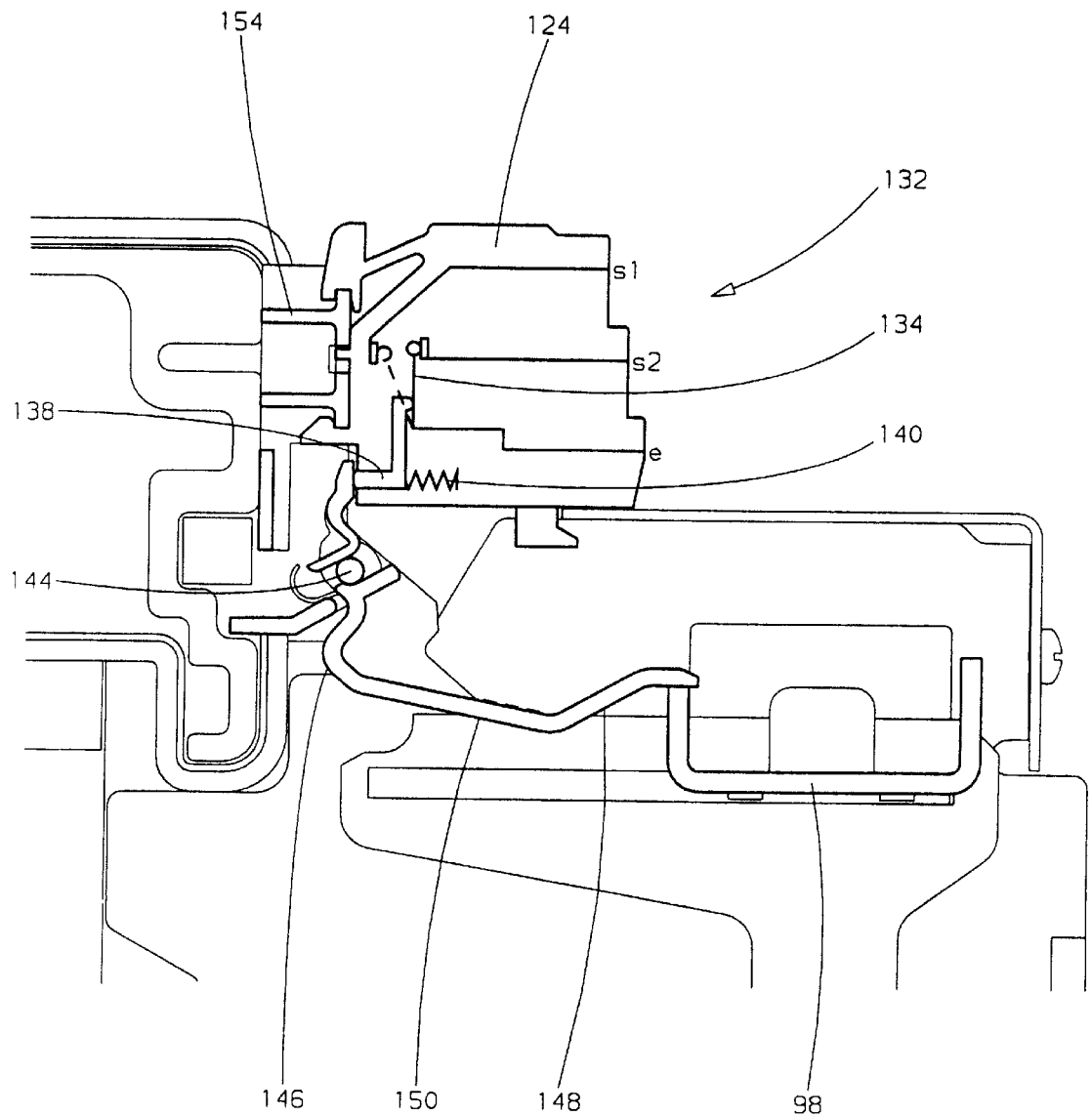
FIG. 9 represents indexing means enabling a switch of the apparatus to be activated when the apparatus is in its test state.
Figure 10:
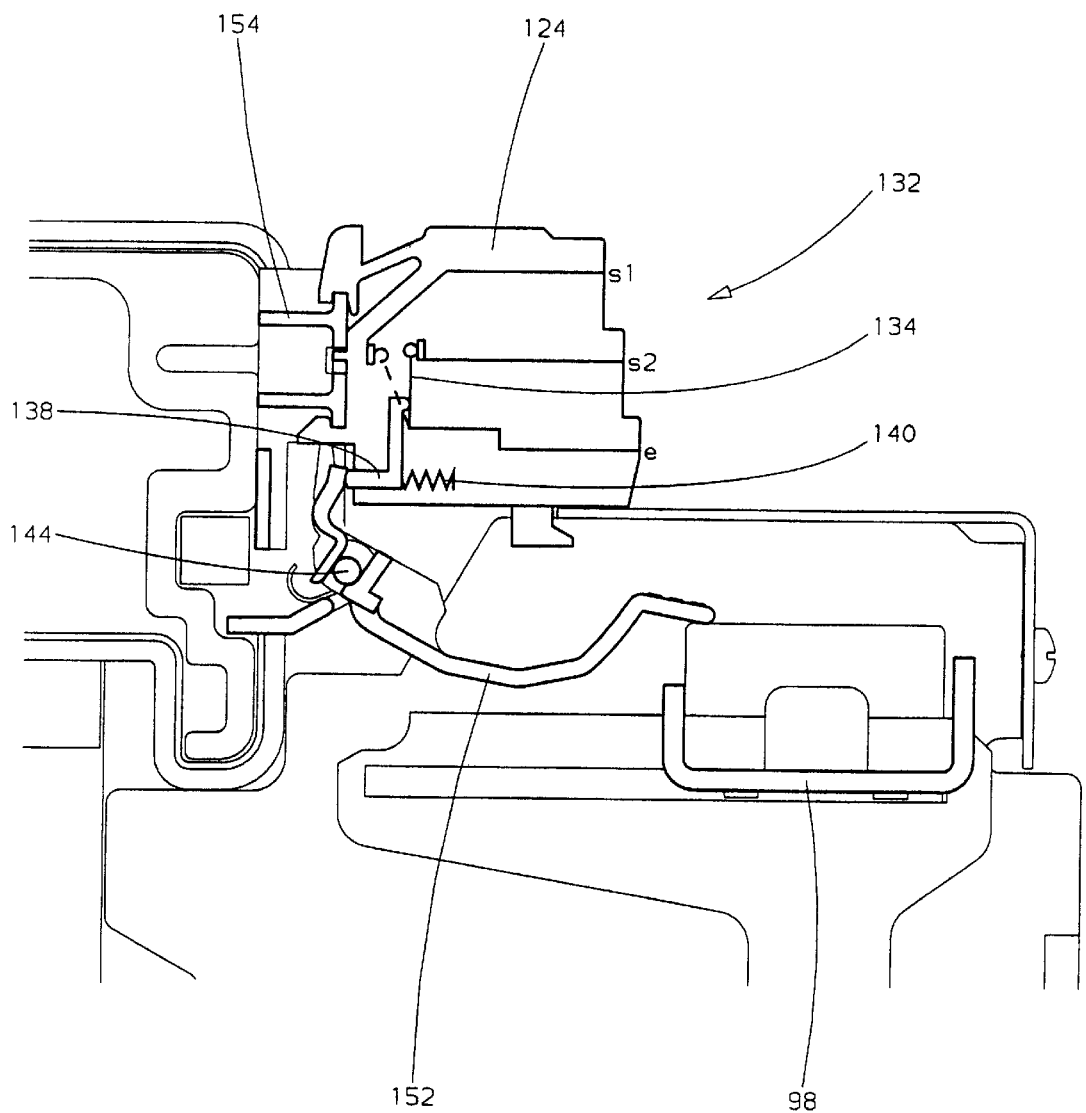
FIG. 10 represents indexing means enabling a switch of the apparatus to be activated when the apparatus is in its plugged-out state.
Figure 11:
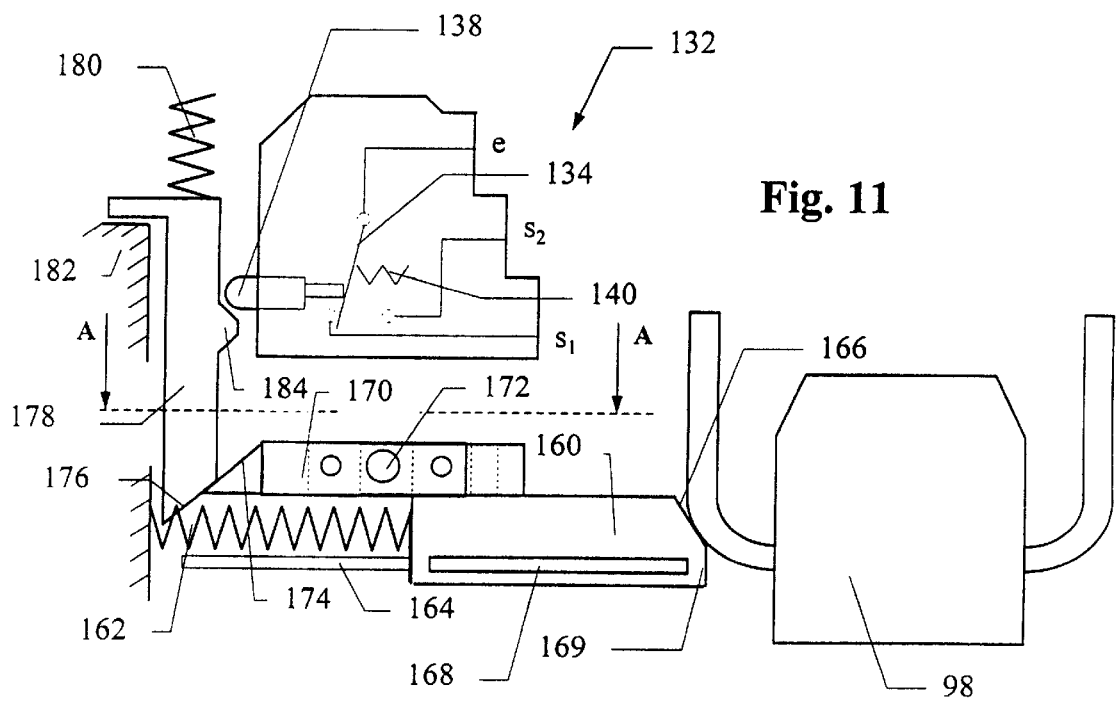
FIG. 11 represents indexing means acting on a switch, in a second embodiment of the invention, enabling a switch of the apparatus to be activated when the apparatus is in its test state.

The lever 146 of FIG. 9 is placed in a recess 156 which enables three switches 132 similar on all points to the previous switches to be fixed. This lever enables passage of the mechanism via the test position to be detected. Unlike the previous lever, this lever is biased clockwise in FIG. 8 by a return spring. When the mechanism is in the plugged-out position, the cross-member 98 is in the raised position and holds the lever 146 against the force of its return spring, so that the pushbuttons 138 are not solicited. When switching to the test position takes place, the cross-member 98 is cleared and releases the lever 146 which, biased by its return spring, depresses the pushbuttons 138. On leaving the test position in the direction of the plugged-in position, the cross-member 98 performs a horizontal translation, encounters a ramp 148 of the lever 146, operates in conjunction with this ramp 148 and raises the drive arm of the lever 146, against the force of the return spring. The lever 146 pivots and releases the pushbuttons 138. In the continuation of the movement to the plugged-in position, the cross-member 98 presses against a flat section 150 of the lever 146 and prevents the lever from returning to its rest position. The form of the lever 146 ensures that the switches 132 are closed if and only if the apparatus is in its test position.

The lever 152 of FIG. 9 operates in conjunction with three switches 132 similar on all points to the previous ones, and is also biased in the clockwise direction by a spring with sufficient force to depress the pushbuttons 138. The form of the lever 152 is such that in the plugged-out position, the cross-member 98 operates in conjunction with the lever 152 and holds the latter in a position releasing the pushbuttons 138 against the force of the return spring. On leaving its plugged-out position, the cross-member 98 releases the lever 152 which depresses the pushbuttons 138. In its subsequent movement to the plugged-in position, the cross-member 98 no longer comes into contact with the pushbuttons 138, so that these pushbuttons 138 remain depressed. The three switches 132 are therefore closed only when the apparatus is not in its plugged-out state, which gives an indication of this position.

A second embodiment of the invention is schematically represented in FIGS. 11 to 14, for which the unchanged elements keep the previously used reference numbers.

Figure 12:
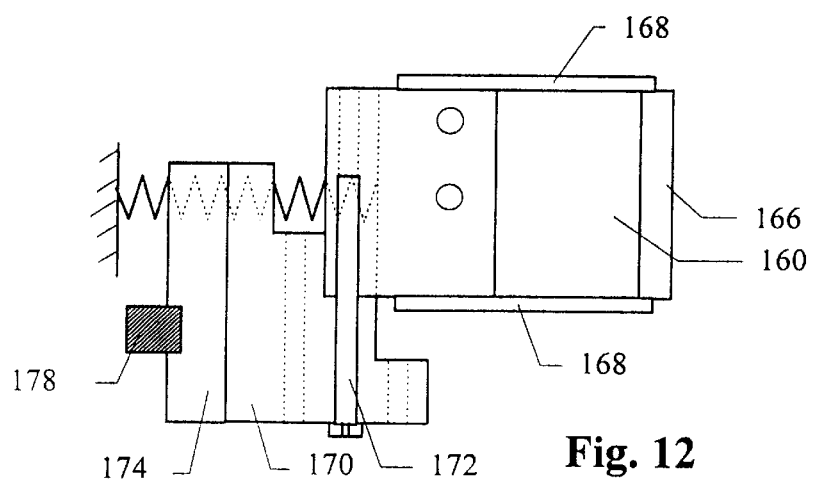
FIG. 12 represents a cross sectional view along the plane A—A of FIG. 11.
Figure 13:
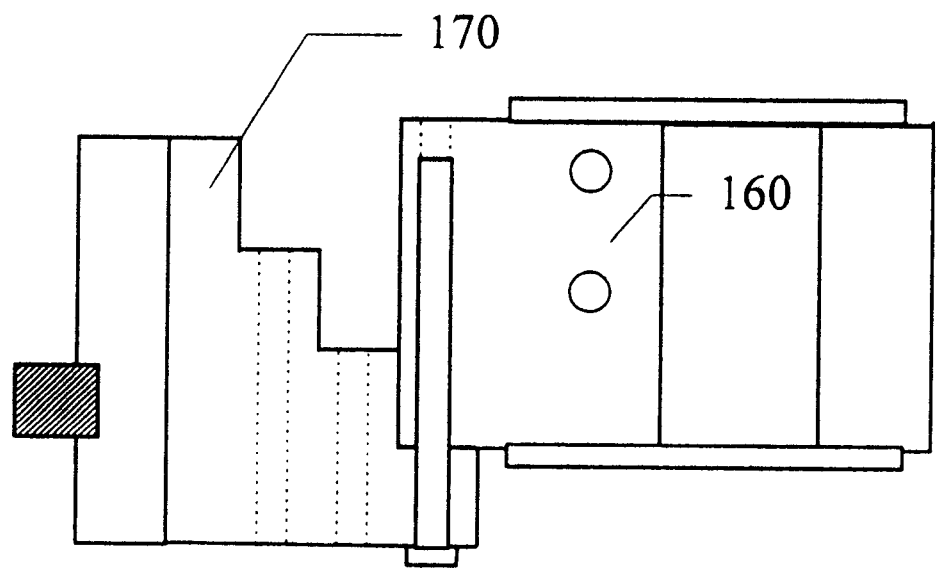
FIG. 13 represents the indexing means of the second embodiment, in a position enabling a switch of the apparatus to be activated when the apparatus is in its plugged-out state.
Figure 14:
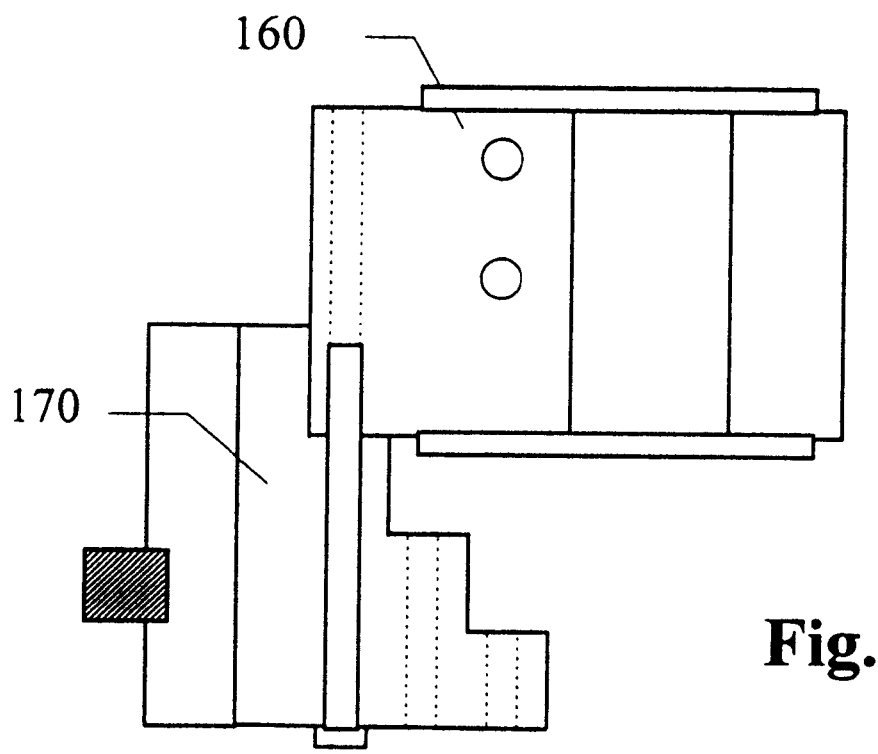
FIG. 14 represents the indexing means of the second embodiment, in a position enabling a switch of the apparatus to be activated when the apparatus is in its plugged-in state.

In this embodiment, the cross-member 98 operates in conjunction with a slide block 160, biased by a spring 162 to the right of FIG. 12 and sliding in a groove 164 secured to the frame by means of lateral tabs 168. When the cross-member 98 performs its vertical translation between the plugged-out position and the test position, it operates in conjunction with a ramp 166 of the slide block 160 in such a way that the slide block performs a horizontal translation. When the cross-member 98 moves horizontally between the test and plugged-in positions, the cross-member operates in conjunction with a bearing section 169 of the slide block, so that the slide block 160 follows the movement of the cross-member 98. Operation of the slide block 160 in conjunction with the cross-member 98 enables the movement of the cross-member 98, which follows an L-shaped trajectory, to be transformed unambiguously into a purely straight movement of the slide block 160.

A stepped indexing means 170 is fixed to the slide block 160 by a screw 172. The indexing means 170 comprise a ramp 174 which operates in conjunction with a complementary ramp 176 of a slide rack 178 guided in translation with respect to the frame 12. The slide rack 178 is biased to its contact position with the indexing means 170 by a spring 180 and limited in this direction by an end of travel stop 182. The slide rack 178 is provided with a cam 184 which operates in conjunction with a push-button 138 of a switch 132 of the same type as that of the first embodiment.

So long as the cross-member 98 has not reached its indexing position, the ramp 176 is not in contact with the indexing means 170, the slide rack 178 pressing on the end of travel stop due to the action of the return spring 180 the pushbutton 138 is then in the raised position. When the cross-member 98 drives the slide block 160 to the left up to the indexing point, the ramp 174 of the indexing means 170 comes into contact with the slide rack 178. Continuation of the movement of the cross-member 98 results in translation of the slide rack 178, so that the cam 184 operates in conjunction with the push-button 138 and depresses the latter. When the cross-member 98 continues its leftward travel beyond the indexing point, the slide rack 178 continues its upward vertical translation so that the cam 184 releases the pushbutton 138. In the opposite direction, it is due to the action of the return spring 180 of the slide rack 178 that the slide rack redescends when it is released by the rightward translation of the indexing means 170 and of the slide block 160.

As in the first embodiment, the electrical switchgear apparatus has several groups of switches arranged on a support base similar to the base 154 of the first embodiment. Each group of switches corresponding to a recess is equipped with indexing means. By modifying the positioning of the stepped indexing means, it is possible to assign an indexing position to each recess indifferently, and to permute the indexing positions assigned to two recesses.

Naturally, different variations are possible without departing from the scope of the invention.

The two embodiments thus refer to switchgear apparatuses for which the circuit breaker does not change position with respect to the frame when the switchgear apparatus moves from the plugged-out state to the test state. Switchgear apparatuses exist for which the circuit breaker is movable with respect to the frame in this phase, so that a position of the circuit breaker in the frame and a position of the plug-in mechanism corresponds unambiguously to each state of the apparatus plugged-out, test or plugged-in. In this case, it is equivalent to take the information on the plug-in mechanism or directly on the circuit breaker.

Furthermore, the second embodiment presents a stepped indexing means operating in conjunction with a slide block having a single bored hole for fixing of the indexing means. A reverse arrangement of the two elements can also be envisaged within the scope of the invention, with a stepped slide block having a plurality of bored holes, and an indexing means of simple form fixed to the slide block alternatively on one or the other of the bored holes, to define the different indexing points.

The shape of the cam acting on the pushbutton can also be modified, in particular by lengthening the part corresponding to the depressed position of the pushbutton, so as to define indexing intervals which are not pin-point.

The switch described in the two embodiments comprises an actuating means formed by a pushbutton. Other types of means can however be envisaged, biased or not to a rest position by a flexible return means.

Each lever of the first embodiment enables three switches to be controlled simultaneously, which enables the wirings to be multiplied and the reliability of the apparatus to be increased. The number of switches controlled simultaneously by an indexing means can however be freely reduced or increased.

What is claimed is:

1. An electrical switchgear apparatus comprising:
   a fixed frame,
   a circuit breaker movable in the fixed frame between a plugged-in position and a plugged-out position,
   a reversible mechanism for driving the circuit breaker between the plugged-in position and the plugged-out position,
   a movable element, secured to the drive mechanism or to the circuit breaker, able to take a plurality of positions with respect to the frame, between a first extreme position and a second extreme position, and defining a first indexed positions interval, which may be reduced to a first indexed position, and a second indexed positions interval, which may be reduced to a second indexed position,
   a first electrical indicating switch comprising at least two terminals and a primary actuating means designed to close an electrical circuit connecting at least two terminals by switching from a first position to a second position,
   a second electrical indicating switch comprising at least two terminals and a primary actuating means designed to close an electrical circuit connecting at least two terminals by switching from a first position to a second position,
   indexing means designed to be fitted on the switchgear apparatus in a first state in which the indexing means are designed to operate in conjunction with the first switch so as to make the primary actuating means of the first switch move from one of the first switch positions to the other when the movable element reaches the first indexed positions interval, and to operate in conjunction with the second switch so as to make the primary actuating means of the second switch move from one of the second switch positions to the other when the movable element reaches the second indexed positions interval,
   wherein
   the indexing means are designed to be fitted on the switchgear apparatus in a second state in which they are able to operate in conjunction with the first switch so as to make the primary actuating means of the first switch move from one of the first switch positions to the other when the movable element reaches the second indexed positions interval, and to operate in conjunction with the second switch so as to make the primary actuating means of the second switch move from one of the second switch positions to the other when the movable element reaches the first indexed positions interval.

2. The switchgear apparatus according to claim 1, wherein the indexing means comprise:
   a first support device,
   a second support device,
   a first indexing means which, in the first state of the indexing means, operates in conjunction with the first support device and with the first switch and which, in the second state of the indexing means, operates in conjunction with the second support device and with the second switch,
   a second indexing means which, in the first state of the indexing means, operates in conjunction with the second support device and with the second switch and which, in the second state of the indexing means, operates in conjunction with the first support device and with the first switch.

3. The switchgear apparatus according to claim 2, wherein, in each of the states of the first and second indexing means, the first and second support devices are fixed with respect to the terminals of the switches and, in each of the states of the first and second indexing means, each of the first and second indexing means is movable with respect to the support device with which it operates in conjunction and is able to perform kinematic transmission between the movable element and each of the primary actuating means.

4. The switchgear apparatus according to claim 3, wherein each of the first and second indexing means is a lever which, in each of the states of the first and second indexing means, is linked by a pivot to the support device with which it operates in conjunction.

5. The switchgear apparatus according to claim 2, wherein, in each of the states of the first and second indexing means, the first and second support devices are movable with respect to the terminals of the switches and are driven by the movable element, and, in each of the states of the first and second indexing means, each of the first and second indexing means is fixed with respect to the support device with which it operates in conjunction and is able to perform kinematic transmission between the support device with which it operates in conjunction and the primary actuating means.

6. The switchgear apparatus according to claim 2, wherein, in another state of the indexing means, the first indexing means is designed to operate in conjunction with the first support device and the first switch so as to make the primary actuating means of the first switch move from one of the first switch positions to the other when the movable element reaches the second indexed positions interval, the second indexing means is designed to operate in conjunction with the second support device and the second switch so as to make the primary actuating means of the second switch move from one of the second switch positions to the other when the movable element reaches the first indexed positions interval.

7. The switchgear apparatus according to claim 1, wherein the movable element defines with respect to the frame a third indexed positions interval which may be reduced to a third indexed position, the switchgear apparatus comprises a third electrical indicating switch comprising at least two terminals and a primary actuating means designed to close an electrical circuit connecting the two terminals by switching from a first to a second position, the indexing means are designed, in the first state, to operate in conjunction with the third switch so as to make the primary actuating means of the third switch move from one of the third switch positions to the other when the movable element reaches the third indexed positions interval, and the indexing means are designed to be fitted onto the switchgear apparatus in a third state in which they are able to operate in conjunction with the first switch so as to make the primary actuating means of the first switch move from one of the first switch positions to the other when the movable element reaches the third indexed positions interval, and to operate in conjunction with the third switch so as to make the primary actuating means of the third switch move from one of the third switch positions to the other when the movable element reaches the first indexed positions interval.

8. The switchgear apparatus according to claim 1, wherein the terminals of the switches are fixed with respect to the frame.

9. The switchgear apparatus according to claim 8, wherein each of the switches comprises a case, the cases of the switches being fixed to a common support base securedly united to the frame and also acting as a support for connectors of an electrical connection terminal between control circuits of the switchgear apparatus and the outside.

10. The switchgear apparatus according to claim 1, wherein the first indexing means has a different form from that of the second indexing means.

* * * * *